United States Patent [19]

Mauney et al.

[11] Patent Number: 5,214,757
[45] Date of Patent: May 25, 1993

[54] INTERACTIVE AUTOMATED MAPPING SYSTEM

[75] Inventors: Thad Mauney; Aglaia C. F. Kong; Douglas B. Richardson, all of Yellowstone County, Mont.

[73] Assignee: GeoResearch, Inc., Billings, Mont.

[21] Appl. No.: 953,761

[22] Filed: Sep. 29, 1992

Related U.S. Application Data

[63] Continuation of Ser. No. 564,018, Aug. 7, 1990, abandoned.

[51] Int. Cl.⁵ .................. G06F 15/403; G06F 3/14
[52] U.S. Cl. .................................. 395/161; 395/600; 395/160; 364/449; 340/990; 340/995
[58] Field of Search ............ 395/161, 160, 155, 140, 395/600 MS; 364/449, 452, 424.02; 340/990, 995, 988; 434/150, 153, 151

[56] References Cited

U.S. PATENT DOCUMENTS

| Re. 32,357 | 2/1987 | Nagao et al. | 364/449 |
|---|---|---|---|
| 4,428,057 | 1/1984 | Setliff et al. | 364/521 |
| 4,584,646 | 4/1986 | Chan et al. | 364/449 |
| 4,590,569 | 5/1986 | Rogoff et al. | 364/452 |
| 4,731,613 | 3/1988 | Endo et al. | 342/357 |
| 4,743,913 | 5/1988 | Takai | 342/457 |
| 4,791,572 | 12/1988 | Green, III et al. | 364/449 |
| 4,796,190 | 1/1989 | Cummings | 364/449 |
| 4,814,711 | 3/1989 | Olsen et al. | 364/449 X |
| 4,815,012 | 3/1989 | Feintuch | 364/521 |
| 4,891,761 | 1/1990 | Gray et al. | 364/452 |
| 4,982,332 | 1/1991 | Saito et al. | 364/449 |
| 4,994,974 | 2/1991 | Cummings | 364/443 |

OTHER PUBLICATIONS

3-D Real Time Scanning, GPS Digitizing Device Can Be Used With ARC/INFO, ARC News, Winter 1989, p. 33.

Primary Examiner—Gary V. Harkcom
Assistant Examiner—Raymond J. Bayerl
Attorney, Agent, or Firm—Dorsey & Whitney

[57] ABSTRACT

An automated, fully transportable mapping system utilizes position information gathered from a Global Positioning Satellite (GPS) capture program to create new maps or annotate existing maps contained in a Geographic Information System (GIS) database in real time. In addition, the present invention displays position information captured by GPS in real-time, enabling users to track the path on which they are travelling. Attributes related to the position information may also be entered in real time, and are stored in a file for subsequent inclusion in a GIS database.

10 Claims, 4 Drawing Sheets

INTERACTIVE AUTOMATED MAPPING SYSTEM

This is a continuation of application Ser. No. 07/564,018 filed Aug. 7, 1990, now abandoned.

TECHNICAL FIELD

The present invention pertains to the creation and generation of maps of geographic features. In particular, this invention pertains to an automated mapping system which utilizes global positioning satellite information to generate or update a geographic information database in real time, or to collect and store in real time positioning and other geographic information for subsequent automatic creation or updating of a geographic information database.

BACKGROUND ART

Creation and update maintenance of maps has traditionally been an expensive and time consuming process. Hand-drawn maps generated from manual survey information are expensive to produce and difficult to maintain and correct. Every feature of the geographic area to be mapped must be surveyed, generating enormous quantities of information. This information is then analyzed, and map drawings corresponding to the survey information are created. Since the survey information is gathered manually, there is ample opportunity for the introduction of errors, such as by erroneous recording of survey information by the surveyors or misinterpretation of survey information by the map drawers. In the event that an error is introduced into a map, that portion of the map containing the error must be manually redrawn, which in itself is a time consuming and expensive process. This is equally true of changes in the geographic area resulting, for example, from changes in street location or direction.

Some of these inefficiencies in the map generation and maintenance process are addressed through the use of a Geographic Information System (GIS) such as ARC/INFO, which is a commonly used geographic information database system, or a Computer Aided Drafting (CAD) system employed for cartography. ARC/INFO provides storage management for both graphical and tabular information. From such a database, maps of geographic areas can be displayed on a computer screen, or can be printed on a computer printer or plotter.

In a Geographic Information System, geographic features such as roads, boundaries, and other spatially dispersed objects are represented within the system as symbolic entities described by one or more sets of coordinates and descriptive information regarding the attributes of the geographic feature represented. These symbolic entities may be generally classified into the following types: point entities, linear entities (including line segments or contiguous groups of line segments referred to in the art as arcs or polylines), area entities (areas bounded by linear entities, referred to in the art as polygons), and annotative entities (text information not attached to a particular spatial entity, although located on the map at a particular spatial coordinate).

The use of ARC/INFO and other GIS or CAD systems has greatly eased the task of maintaining an existing map of a geographic area by automating the process of drawing a map from the survey data. However, use of such a system does not address the inefficiencies involved in obtaining the survey information in the first place. If traditional manual survey techniques are used, the information obtained in the survey must still be manually entered into a computer for inclusion in the GIS database. Besides being tedious, time consuming, and expensive, this process is fraught with the potential for erroneous input of data.

An alternate survey technique involves the use of aerial photography of the geographic area to be mapped, followed by the digitization of the information from the photographs into the database. This process is more efficient than manual survey techniques in that aerial photography gathers information in photographic form quickly, and the digitization process eliminates much of the manual entry of information. However, digitization of aerial photographs still involves the manual effort of tracing the geographic features to be mapped on the photographs, and still requires a substantial expenditure of time and effort. In addition, the aerial method is ill suited to annotation of existing maps with attribute information such as the location of fire hydrants, or street addresses since this information is not readily discernable from an aerial photograph.

A more recent technology capable of increased efficiency over traditional survey techniques involves the use of Global Positioning Satellites (GPS). These satellites can be used with an appropriate GPS receiver to determine the location of the receiver in latitude, longitude, and altitude. By placing such a receiver in a vehicle, a path to be mapped can be driven by the vehicle, with the GPS receiver capturing position information at specified time intervals along the path. In this way, information can be quickly obtained on the location of points along the path, and such information can be used for the generation of maps. Unfortunately, the information obtained from a GPS receiver is not in a form which is usable by a GIS database manager such as ARC/INFO. Prior art system have solved this problem by having the surveyors return to the laboratory or office with the captured GPS data, and executing a computer program which converts the data from the GPS format to a GIS format.

While the above improvements to traditional mapping techniques have significantly increased the efficiency of map creation and maintenance, several inefficient and cumbersome areas remain. For example, existing GPS systems process captured GPS data after returning from the field. If after processing the data into the GIS database it is learned that additional information is needed, a second trip to the field is necessary to gather the missing information. This could occur, for example, during the mapping of city streets if the surveyors fail to travel down all of the streets in the survey area.

In addition, prior art GPS data systems store only location and time information. Mapping involves much more than merely plotting the location of streets or paths. Other geographic features are often equally important, such as street addresses, the locations of fire hydrants or street signs, or any other information which could conceivably be included in a map. There is no facility in existing GPS systems for annotating or updating an existing map database with new attribute information.

Another difficulty with present GPS systems is the lack of a real time operator interface with the system. For example, when mapping a complicated grid of paths such as that formed by city streets, it is necessary to keep track of where the mapping vehicle has been in order to avoid retracing paths and to ensure that no paths are missed. It is difficult and inconvenient to manually keep track of the traced path, and existing GPS data capture systems provide no facility for automatically documenting traced paths and displaying this information to the operator.

SUMMARY OF THE INVENTION

In accordance with the present invention, an automated and real time interactive mapping system is provided, in which a GPS receiver is used to capture position information as the receiver is moved along the path to be mapped, and wherein the captured information is provided as input to a GIS database in real time and without operator intervention. Attribute data is also gathered in real time for subsequent inclusion in the GIS database, or may be entered directly into the GIS database in real time if the particular GIS database employed will so allow.

The interactive mapping system of the present invention uses a GPS receiver for receiving signals from global positioning satellites, a computer connected to the GPS receiver for storing incoming GPS position information, and a second computer connected to the first computer which executes a GIS database program and receives information in real time from the GPS computer.

Mapping a geographic area involves installing the interactive mapping system into a vehicle, and driving the vehicle over a particular path to be mapped. Alternately, the system could be carried or otherwise transported along the path to be mapped. At regular intervals, the GPS receiver sends data packets to the GPS computer which contain position information as derived through communications with the global positioning satellites. This information can be stored in a raw data file on the GPS computer, and can also be processed into a form for use by the GIS database.

The GIS database is managed by any one of a number of commonly available geographic information database programs such as ARC/INFO, wherein the database is capable of storing both graphical and tabular data. A common means of data entry into a GIS database is via a digitizer tablet. In the present invention, the GIS database program is instructed to accept digitizer input, and the GPS computer converts captured GPS data into appropriate GIS entities for inclusion in the GIS database, and enters them into the GIS database by emulating a digitizer.

In addition to using the system of the present invention for creating new maps, an existing map in the GIS database can be annotated by displaying the existing map as a background while the path being travelled is displayed in the foreground using the GPS. Attributes are gathered in real time to be post processed into the GIS database at a later time. The forground display provides a real-time display of what portions of the existing map have been travelled.

Accordingly, it is an object of the present invention to provide a system and method for automatically creating or updating a geographic information database by capturing GPS position information using a mobile GPS receiver and generating appropriate GIS information in real time as the geographic feature is travelled.

Another object of the present invention is to convert captured GPS position information into signals emulating a conventional digitizer, thereby allowing real-time creation or update of a GIS database.

Yet another object of the present invention is to provide a real-time display of the path followed by the receiver as it is moved along the area to be mapped.

A further object of the present invention is to provide a facility for real-time capture of geographic attributes to be added to a new or pre-existing GIS map database.

These and other objectives of the present invention will become apparent with reference to the drawings, the detailed description of the preferred embodiment, and the appended claims.

DETAILED DESCRIPTION OF THE PREFERRED EMBODIMENT

Figure 1:
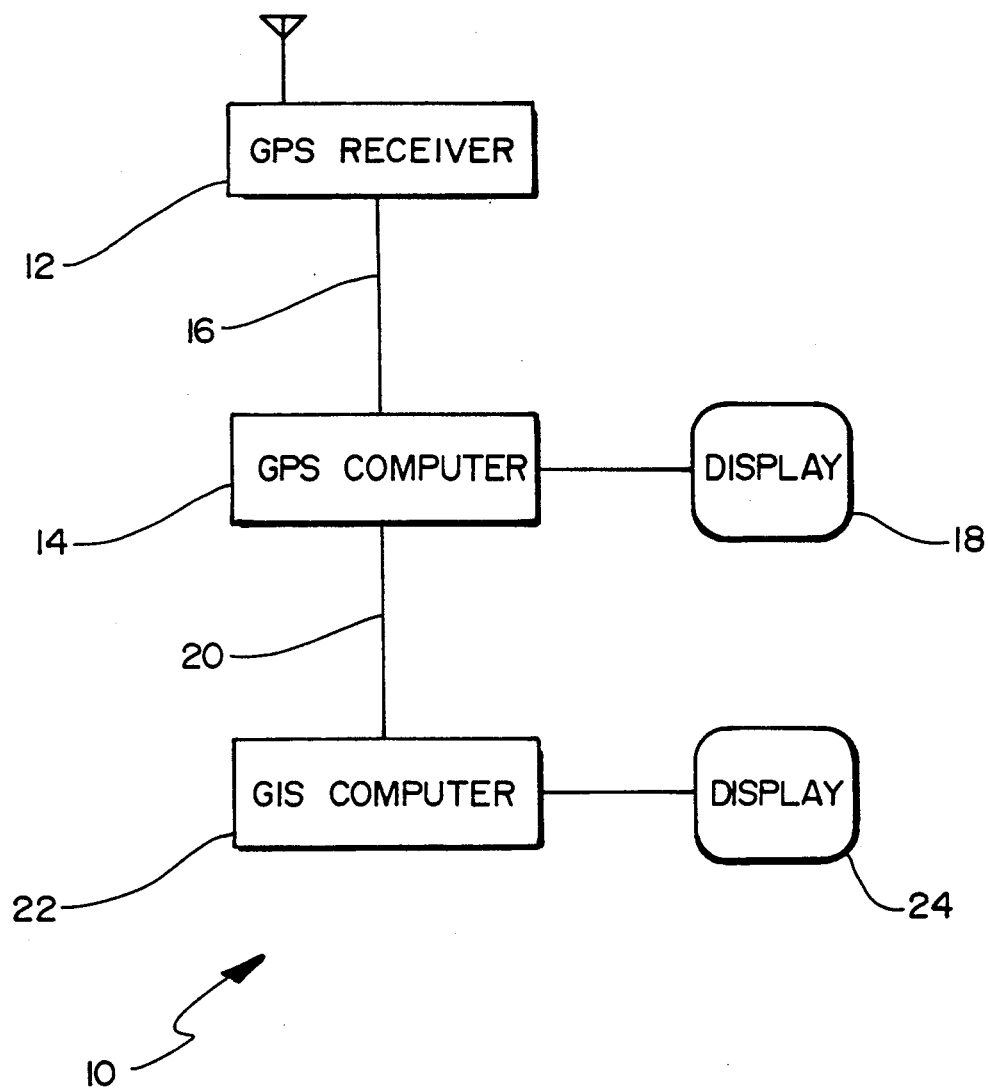
FIG. 1 shows a block diagram of the various components that comprise an interactive mapping system in accordance with the preferred embodiment of the present invention.

Referring now to FIG. 1, an automated mapping system 10 is shown according to the preferred embodiment of the present invention. A GPS receiver 12 receiver radio signals from positioning satellites and derives from these signals time, position and operating condition information. Position information includes latitude, longitude, altitude, and is associated with the time at which such a position fix was obtained. Operating condition information includes the identities of of the satellites being employed for the calculation of position, their respective signal to noise ratios (SNRs), the orbital parameters of the satellites, known as the ephemeras and almanac, and parameters indicating the probable uncertainty in the calculated position.

Information from the GPS receiver 12 is sent to a GPS computer 14 through a GPS communication link 16 between the GPS receiver 12 and the GPS computer 14. In the preferred embodiment, the GPS communication link 16 is a standard RS-232 serial line, but could be any of a variety of other communication means such as RS-422. A GPS capture program executing in the GPS computer 14 processes position information received from the GPS receiver 12, displays the position information on a display screen 18 numerically, graphically, or both, and sends the position information to a second communication port 20. This communication port 20 is also a standard RS-232 serial line, or other communication means, and is connected to a GIS computer 22. The GIS computer 22 includes a display screen 24, and executes a standard GIS database management program.

GIS database programs are typically used with manual information entry methods such as digitizing tablets, and thus it is advantageous for the GPS computer 14 to communicate with the GIS computer 22 in a manner that emulates a digitizing tablet. In this way, information can be entered into the GIS database without manual intervention being required.

In an alternate embodiment, both the GPS capture program and the GIS database program could be run on a single computer under a multi-tasking operating system such as UNIX ®. Communication between the programs would be via a shared file, an inter-program data exchange path, or other methods as known in the art. In this way, both programs would execute on a single physical computer due to the ability of the multitasking operating system to simulate the action of two or more separate computers.

Figure 2:
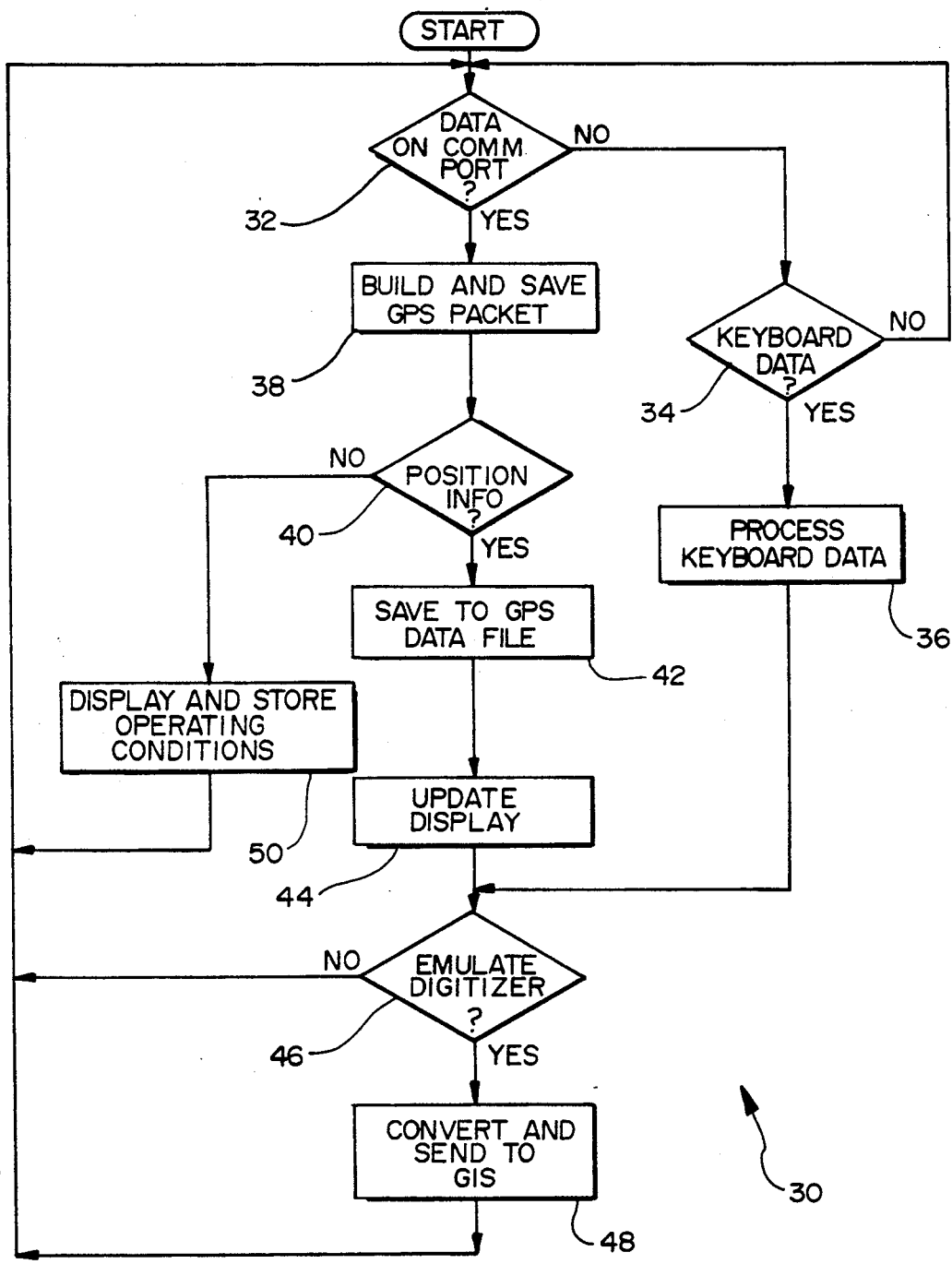
FIG. 2 shows a flow chart of a GPS capture program of the present invention.

Referring now to FIG. 2, a flow chart of a GPS capture program 30 executing on the GPS computer 14 is shown. In the preferred embodiment of the present invention, the capture program begins by checking whether incoming GPS data has been received through the GPS communication port at step 32. If GPS data has been received through the GPS communication port at step 32. If GPS data is present, the data is interpreted as to its respective type, and is displayed, stored, or transmitted in a manner as described below. If no GPS data is present, then the program checks for keyboard data, also as described below.

When GPS data is detected by the program at the communication port at step 32, the program builds the data into a string until a complete packet of information is received at step 38. Next the program checks the type of information contained in this packet and processes it according to its type. If position data has been received at step 40, the position data is saved to the GPS data file at step 42 along with its time stamp, the screen display is updated at step 44, and according to the operator's selection of program parameters, may emulate a digitizer at step 46, allowing the GPS data to be converted and sent to a GIS database at step 48 in a manner to be described below. In the event that real time GIS interaction is not desired, the GPS program loops back to the beginning to repeat the process. If the packet does not contain position data at step 40, it contains operating condition data, which is displayed and/or stored at step 50 according to the operator's selection of program parameters. The program then loops back to the beginning as above.

In normal operation of the preferred embodiment of this invention, various operating condition data are treated differently, with satellite selection and dilution of precision data (measures of positional uncertainty) being both displayed and stored, ephemeras data being stored but not displayed, velocity, GPS system time, and mode of position fix calculation being displayed but not stored, and command acknowledgments being neither displayed nor stored. Those skilled in the art will recognize that the treatment of operating condition data is not critical to the operation of the present invention, but may be varied according to specific requirements, while remaining within the scope of the present invention.

If no GPS data is present at step 32, the program checks to see whether data has been received from the keyboard at step 34, which would indicate to the program that attribute data or command data is being entered. The type of attribute data is virtually unlimited, depending only upon the desired features to be included in the map. Typical examples include the names of geographic features being traversed, their descriptions (such as addresses or other observable descriptors), the beginning and ending points of line-type features, the presence of point-type features (such as manholes, fire hydrants and pavement defects), and the character of area-type features (such as soils, crops, and land usage).

Attribute information is processed and stored at step 36 together with its respective type information, and the position and time at which the attribute information was received in the GPS attribute file. Entry of an attribute may also define the extent or location of a GIS entity. For example, if a "fire hydrant" attribute is entered, the attribute is stored as described above. In addition, a point-type entity is created in the GIS database through the digitizer emulation interface 46, 48, and to which the attribute will be attached in the database. If mapping city streets, a "node" attribute is inserted at every intersection. The node entry causes the current line-type entity to be terminated, and informs the GIS database that subsequent position information will be part of a new line-type entity. Creation of entities for the GIS database is dependant upon the type of database being used, and the type of digitizer being emulated, and will be discussed in further detail below. After the attribute information has been sent to the GIS database 48, the program returns to the start position and resumes checking for GPS data from the GPS communication port at step 32.

Command data comprises directives regarding operation of the GPS capture program, such as starting and stopping of GPS capture operation, names of files to employ, aspects of captured data to be displayed to the operator, and any other matters necessary to the operation of the program in accord with the wishes of the operator. Commands are executed by the program at step 36, and since there is no digitizing associated with command execution 46, the program returns to the start position (or may terminate, depending upon the specific command executed).

Figure 3A:
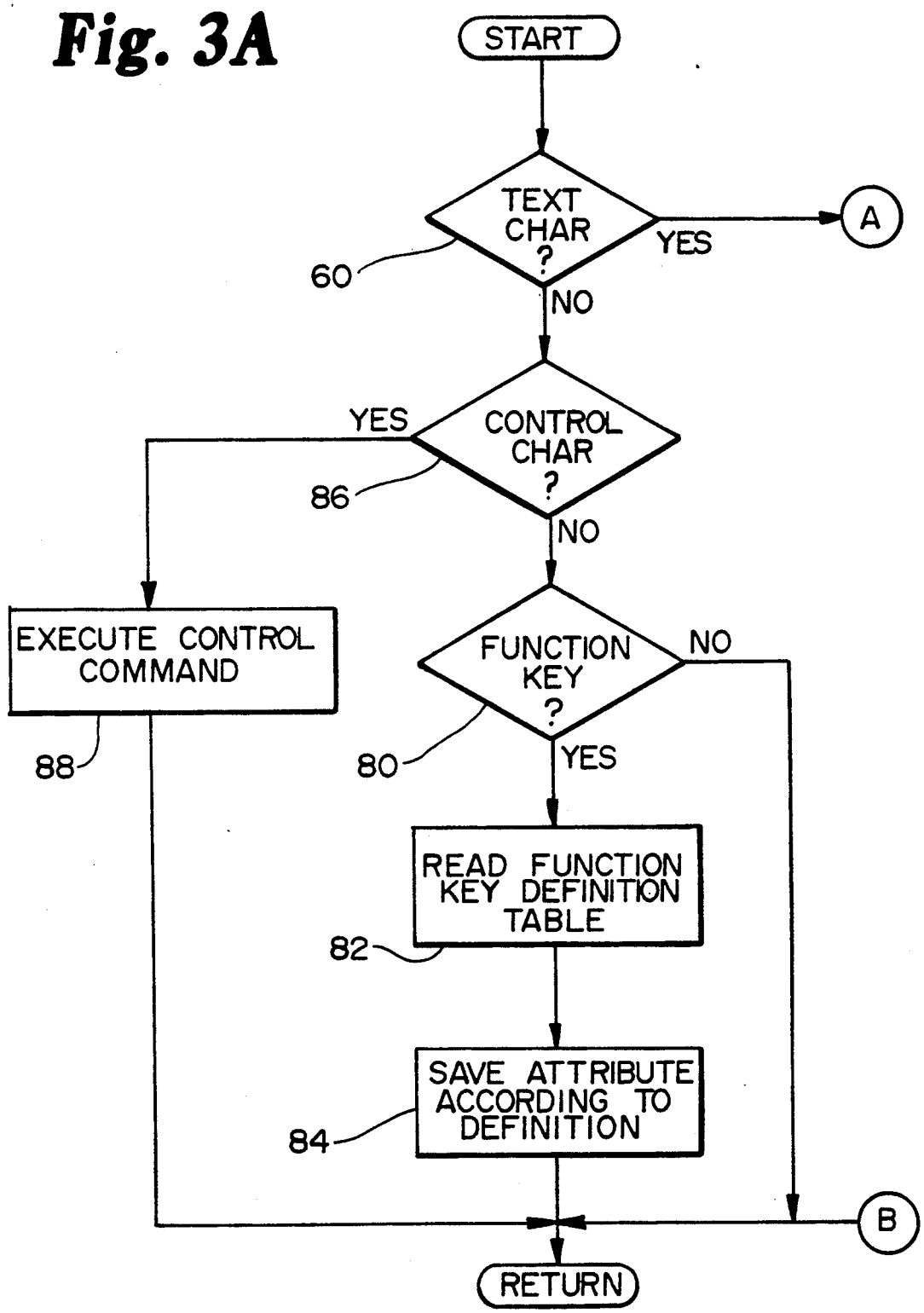
FIGS. 3A and 3B show a flow chart of the process keyboard data portion of the GPS capture program of FIG. 2.
Figure 3B:
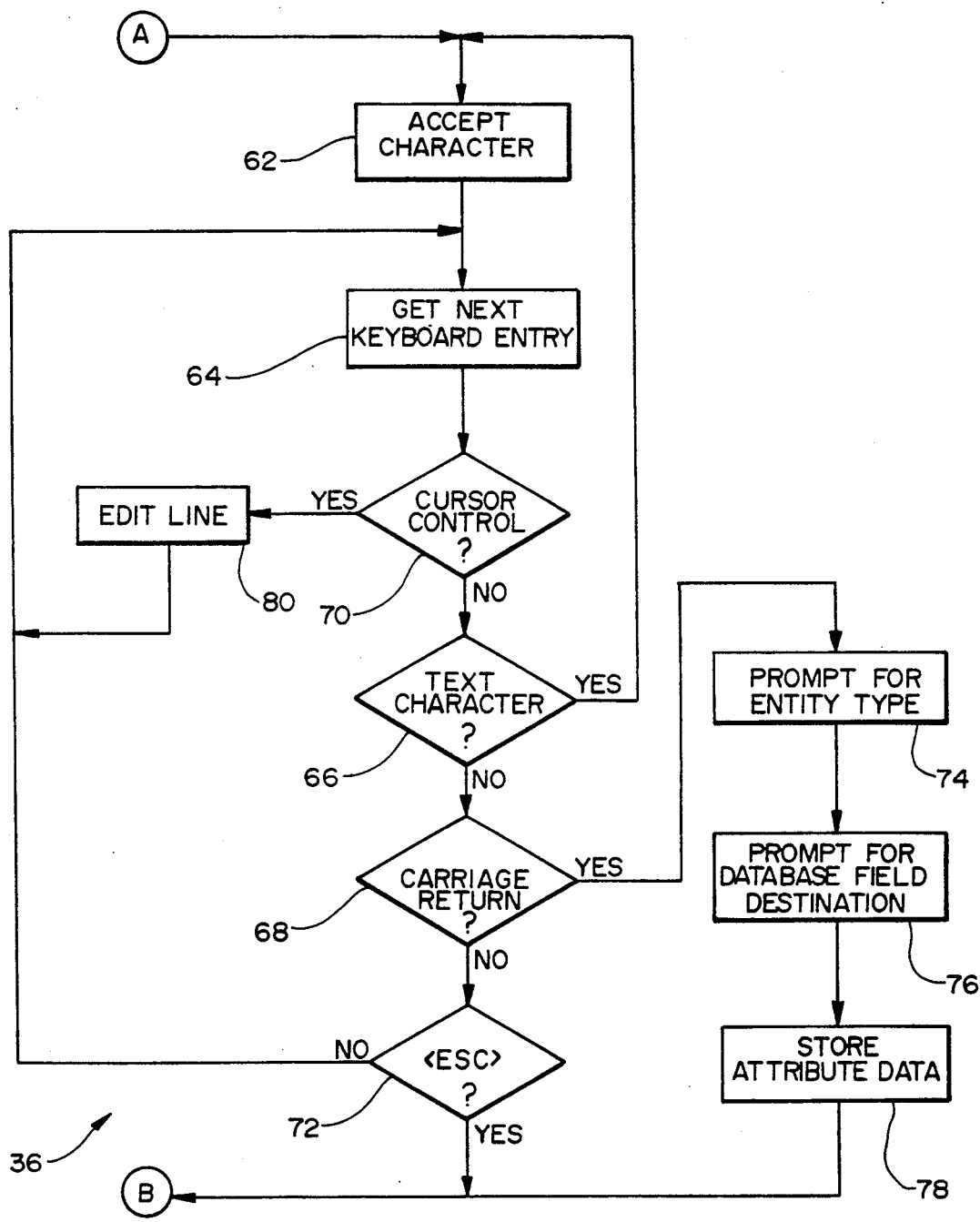

Referring now to FIG. 3, a flow chart of the keyboard data processing portion at step 36 of the GPS capture program 30 is shown. Character data received from the keyboard is classified as to the category of key pressed: text keys, cursor control keys, control keys or function keys.

If a text character is detected, the data received is interpreted as belonging to the descriptive text portion of an attribute to be entered in the database. Therefore, the program proceeds to accept characters at step 62 and poll for keyboard entry at step 64 as long as text characters are entered at step 66. Completion of a line of text is signaled by the receipt of a carriage return character at step 68. During this process, any cursor control characters received at step 70 cause an adjustment to the position of the text entry cursor within the text string being constructed, so as to allow editing of the text string at step 80 in a manner known in the art. An escape character (<ESC>) at step 72 terminates string entry without saving any attribute information.

Upon completion of the line of attribute text, the program asks the operator to indicate the type of entity at step 74 to which the attribute just entered is to apply. An entity is a graphical element stored in a GIS database, and entity types include arcs (linear or segmented linear entity), points, polygons (an area enclosed by linear or segmented linear entities), nodes (an endpoint of a linear or segmented linear entity), and comments (an annotation applying to no particular GIS entity). The entity type having been received, the program asks the operator for the data base field destination at step 76, which is the number of the column in the attribute database into which the particular text item is to be placed in constructing the attribute database entry regarding the present GIS entity. This having been received, the program then builds and stores an attribute data packet. The information contained within the packet includes the geographic position at the time of attribute creation, the time of attribute creation, the text of the attribute item, the entity type, the database field destination code, and an identifying attribute serial number. The data packet is then saved in a GPS data file, an attribute data file, or both, as determined by program operating parameters.

In an alternate embodiment of the present invention, the attribute input means may be a measuring instrument measuring some aspect of the conditions at various intervals along the path to be mapped, which transmits these as digital values to the GPS capture program. The GPS capture program then records these as attributes along the path being mapped. In another alternate embodiment of the present invention, the attribute input means may be a voice encoding device which translates spoken words into digitally encoded text, which is then transmitted to the GPS capture program. Again, the GPS capture program records these as attributes along the path being mapped.

One difficulty with manual typing of attribute information, is that depending upon the attributes being captured and how frequently they occur, the typing speed of the operator may place a limit on how fast the vehicle containing the mapping system may travel along the path to be mapped. For example, if the attributes to be captured were the street addresses of every house on a typical city block, the vehicle would have to drive very slowly in order to allow the operator to manually type in the address of each house as it is passed by the vehicle. In order to alleviate this problem, attribute shorthands may be prepared in advance and assigned to function keys, allowing most or all of certain attribute information to be entered with a single keystroke. Function key assignments are defined in a function key definition table, and may include attribute text, entity type, database field destination, and may also include a numerical variable which may be automatically incremented or decremented on each successive attribute entry by a predetermined amount.

When a function key is received at step 80, the program reads the function key definition corresponding to the pressed function key from the function key definition table at step 82. The attribute is then saved in the GPS data file or attribute data file at step 84 according to the definition in the function key definition table.

In practical operation of the creation of GIS map databases, it often occurs that attributes are highly similar within a particular mapping project and therefore only part of the information changes from entry to entry, therefore, special codes may be embedded within the function key text definition which cause the program to prompt the operator for specific types of information which constitute the variable position of the attribute information. For example, addresses along the street are all different whereas the name of the street is constant, therefore the text may contain the name of the street traversed, along with a "#" symbol which causes the program to ask the operator for the numerical address, while freeing him from repetitive typing of the street name. As a further example, along the highways, mile posts are normally numbered sequentially. Therefore a shorthand symbol such as "[1]" is placed in the function key definition string, and indicates to the program that a number is required from the operator, and that the program is to offer a prompting value to the operator equal to the previous entry increased by one. If the operator should then respond with the minus key, the program should then decrease the number, and upon subsequent uses of that function key offer the previous entry decreased by one, so that when the highway is traveled in either the direction of increasing or decreasing milepost, the most likely next value is always offered as a prompt.

If a control character is received, the program executes a command function that has previously been assigned to that control character. For example, in the preferred embodiment of the present invention, <ctrl>A causes the program to display the amount of remaining space available on the current data storage disc, <ctrl>B causes the program to refresh the display of the map background, <ctrl>D causes the program to display the map graphically on the full screen, omitting the numerical information heading, or to return to the shared numerical and graphical display, and so forth, and <ctrl>F causes the function key definition table to be displayed and changes to be accepted. In the special case of the control character <ESC> the program loop is suspended and the command menu system is activated to allow the operator to alter program parameters, or to terminate the program.

Those skilled in the art will recognize that the details of keyboard processing depend upon the GIS database being used, and the specific application of the mapping system. Many variations may be made, including control character assignment and function key assignment, without departing from the scope of the present invention. In addition, the types of entities may vary, depending upon the GIS database being used.

Referring again to FIG. 2, some details concerning the process of converting GPS data into a GIS usable form at step 48 will be discussed. All GPS data is in the form of point coordinates. While some map features may indeed be "points" (such as a fire hydrant), map features are more typically lines or areas (such as streets or open areas). It is therefore necessary to treat a set of GIS points in such a way as to create the appropriate graphical entity when entered into the GIS database. The preferred embodiment uses the ARC/INFO GIS database system, with the GPS program emulating a Calcomp 9000 series digitizing tablet.

In the case of point type entities, their creation is accomplished in the preferred embodiment of the present invention simply by entry of an attribute of point type with or without accompanying text. This is because the entry of an attribute includes the coordinates at the time attribute entry which, along with the entity type code, is sufficient to define the presence of a point-type entity in the GIS database. Normally, however, text describing the type of geographic object represented by the point accompanies the coordinates so that in the GIS various classes of point type features may be represented simultaneously in a single map without confusion. For example, manholes, light poles, fire hydrants and street signs are all point-type entities, and could be present in a GIS map database, distinguished either by a word or by code numbers, and plotted on the resultant map with distinct symbols automatically selected to correspond with the code word or numbers.

In the case of linear type entities, their creation is accomplished in the preferred embodiment of the present invention by collecting a series of position fixes while traveling along the path of the geographic feature to be represented, such as a street or river, and entering a node type attribute when the end of the entity is reached. This is sufficient to define the entity because the starting point of the traverse may be presumed to be the intended starting point of the entity, and the entry of a node type attribute forces the system to indicate to the GIS that the entity has ended, and that the next point transmitted will belong to a different entity. When transmitting data to the ARC/INFO GIS by emulation of a digitizing tablet, the start and end of the entity are indicated by prefixing the coordinates by a node code 2D. In the event that real time GIS interaction is not desired, the GPS program saves the entity information in a GIS entity file, indicating the start and end of entities by using a delimiter as may be conventional according to the specific GIS database employed. For example, when constructing ARC/INFO entity files, the entity delimiter is indicated an END line stored in the file.

Normally, linear entities may be described by one or more attribute items, which in the preferred embodiment of the present invention may be entered by the operator at any time between the beginning and ending nodes of the entity. This is sufficient because the attributes of a linear entity apply to the entire entity, rather than to specific points within it. When constructing GIS database files, the entity is assigned an identifying serial number, and the attributes of linear type acquired between the beginning and ending nodes of the entity are collected together into a single line of information according to the respective database field destination code numbers associated with the various attribute entries, and this line of information is assigned the same identifying number as the entity so that the entity and attribute information are respectively associated.

In typical mapping, linear entities are connected to one another, as for example blocks of a particular road may be described as having different address attributes, but are nonetheless continuous with one another. Therefore in the preferred embodiment of the automated mapping system, the entry of a node type entity causes both the ending of one linear entity and the beginning of the next linear entity simultaneously. If linear entities are not of interest, or if a segment traversed does not pertain to any feature of interest, the recording of linear type data may also be paused by the operator by entering the control character <ctrl>P command.

Area entities cannot be entered into the ARC/INFO GIS database directly, but rather the boundary of the entity must be defined by one or more linear entities, which may be created by automated mapping or by conventional GIS data entry means. Post processing by the GIS program causes the area entity to be created. Assignment of attributes to area entities requires that descriptive information be associated with a point which is within the boundaries of that entity. If the boundaries of the entity are created in the GIS by means other than the automated mapping system, or with a separate session with the automated mapping system, then ascription of attribute information to the area type entity may be accomplished by moving to a position within the geographic feature of interest and entering one or more area type attributes with a common identifying number and proper assignment to respective database field destinations. In the creation of GIS database files the attribute entries will be collected into a single line according to the identifying number and the respective field destinations, and the GIS database will recognize that the label point within that area describes the attributes of the area entity.

However, in the case that an area entity is to be assigned attributes while in the same automated mapping session during which the bounding linear entities are simultaneously being created by a traverse of the perimeter of the area entity or a portion of the perimeter, the points traversed will not be clearly ascribed to either the area on the right nor the area on the left of the path traversed. Assignment of the attribute would then be ambiguous as to which area was being described. In order to resolve this ambiguity, the preferred embodiment of the present invention permits the operator to indicate that the location of an area type attribute is offset from the actual location of the automated mapping system by some distance given by the operator and in a relative direction either according to the compass, or according to the right or left of the direction of travel of the mapping system. This offset is applied to the coordinates associated with the attribute, so that when the data stored are transformed into GIS data files, there is no ambiguity as to the area to which the attribute applies.

Annotations not associated with any particular spatial entity may also be entered into the GIS database. The automated mapping system records the text of that annotation along with the coordinates and time at which it was entered, and a type code indicating that it is of annotation type. In creation of GIS database files, it is translated into the annotation layer of the GIS database which contains only text, or may be used by the operator as an aid to memory, but not entered into the GIS database at all. For example, this type of information may include supplemental observations, notes as to difficulties encountered, and so forth.

Prior to initiating a GIS data capture session, certain setup procedures are required. The GPS capture program transmits coordinates relating to the approximate boundaries of the area to be mapped, and numerical coordinates of convenience establishing reference tic marks to be included in the GIS database for alignment of various map datasets as is conventional to the practice of digitization of map data for GIS databases. These values are established by the operator entering them into the program prior to initiation of digitizer emulation, and are preferred to be saved by the GPS capture program from session to session so as to minimize repetitive entry.

When a node point is to be transmitted, the GPS capture program transmits a line of data in the form of 2Dxxxxxxxxxxyyyyyyyyyy<cr> in which the 2D prefix indicates that the coordinates x and y are the coordinates of a node point.

When a vertex point, being the endpoint of two adjacent segments within a segmented line-type entity (arc entity) or the label point of a point type entity or of an area type entity is to be transmitted, the GPS capture program transmits a line of data in the form of 1Dxxxxxxxxxxyyyyyyyyyy<cr> in which the 1D prefix indicates that the coordinates x and y are the coordinates of a vertex point.

When the cursor of the GIS computer is to be moved to a point, but no entity is being created at that point, then the GPS capture program transmits a line of data in the form of 0Dxxxxxxxxxxyyyyyyyyyy<cr> in which the 0D prefix indicates that no entity is to be created, but that the cursor is to be moved.

When other functions are assigned to digitizer keypad buttons, these are emulated by transmission of a line of data of the form nD<cr> in which the number n indicates which keypad button function is to be executed.

In the transmission of digitizer emulation data, the coordinates are transmitted in degrees of longitude as x and latitude as y, in decimal value with preferably at least six significant digits after the decimal point, whether the decimal point is implicit as in the preferred embodiment or explicit in alternate embodiments.

It will be noted that in certain commercial GIS database programs, the digitizer input program is unable to accept negative values for coordinates, therefore in the western or southern hemispheres where conventionally coordinate values of longitude or latitude respectively are represented as negative, the GPS capture program transmits only the absolute values of the coordinates, and the operator informs the GIS database program of the actual quadrant of the globe represented, so that the GIS database is constructed with appropriately signed coordinates. In certain commercial database programs this correction of coordinate sign is performed as a separate process subsequent to collection of digitizer information, and is a conventional activity known in that art.

While in the process of collecting data for the creation of new maps or for the updating of existing maps, it is helpful to the operator of the automated mapping system to see a graphic presentation of the previously travelled path or paths, in order to avoid omission of features or duplication of effort. Therefor, the automated mapping system of the preferred embodiment graphically displays the paths travelled by the system to the operator, and adds each newly received coordinate point to the display as it is received. In the event that the system is transported to a point which is outside the boundary of the graphic image displayed on the display screen, the system recalculates the boundaries of the area to be displayed so that the new position is located in the center of the display, and redraws the map image.

In addition to display of the currently collected path data, it is also helpful to the operator to view other map information as a supplemental background. This background map information may derive from previous automatic mapping activity, or from GIS information obtained by traditional GIS information gathering means such as digitization of paper map documents. The automated mapping system thus provides the operator with the ability, through the menu command system, to cause a GPS map data file or a GIS map data file to be graphically displayed on the screen as background to the display of currently collected data. Upon recalculation display area boundaries due to travel outside the boundaries, the background display boundaries are also automatically recalculated and the map image redrawn.

In the event that the operator does not desire the background map image or the currently collected foreground map image to be redrawn upon each recalculation of the boundaries of the viewed portion, as may occur if the operator finds this operation to be too slow, or finds the combined map image to be too complex, then this redrawing feature may be disabled by execution of program control commands.

The preferred embodiment described above contemplates the installation of the entire system within a vehicle. However, those skilled in the art will recognize that the entire system could be manually carried, or otherwise transported along the path to be mapped without departing from the scope of the invention. In addition, the GPS receiver could be carried along the path to be mapped, with the remainder of the system remaining at the lab or office, and GPS information relayed from the receiver to the GPS computer by way of radio or mobile telephone communication.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. A mobile mapping system, comprising:
    means for transporting the mapping system along a path to be mapped;
    input means for capturing satellite based position information at various positions of the mapping system along the path to be mapped;
    means for storing the position information;
    means for entering and encoding attribute information into a plurality of attribute data packets, and recording the attribute data packets into the mapping system in real time as the input means is moved along the path to be mapped;
    means for storing the attribute information;
    means for representing a plurality of geographic features and the spatial relationships of the features through the encoding of graphical entities selected from a set of graphical entities including points, lines, arcs, polygons, and nodes, and relating the position information and the plurality of attributes to the graphical entities to further characterize and distinguish between the plurality of geographic features;
    means for managing and organizing data in a geographic information system;
    conversion means for conversion of the position information, the graphical entities, and the attribute information into a form for use by the geographic information system; and
    means for accessing the position information, the graphical entities, and the attribute information in the geographic information system so that previously entered geographic information can be updated.

2. A mobile mapping system according to claim 1, further comprising display means for displaying in real time a graphical representation of captured position information and attribute information as the input means is moved along the path to be mapped.

3. A mobile mapping system in accordance with claim 1, further comprising means for assigning and relating attributes to graphical entities representing geographical area features located at a coordinated offset distance from the location of the transporting means.

4. A mobile mapping system, comprising:
    means for transporting the mapping system along a path to be mapped;
    input means for capturing satellite based position information at various positions along the path to be mapped;

first computing means connected to the input means comprising:
  means for storing the position information;
  means for conversion of the position information into a form for use by a geographic information system;
  means for entering and encoding attribute information into a plurality of attribute data packets, and recording the attribute data packets into the mapping system in real time, wherein the attribute data packets are related to the position information;
  means for storing the attribute information;
  means for conversion of the attribute information into a form for use by the geographic information system; and
  means for encoding entities symbolizing a plurality of geographic features and the spatial relationships of the features through the encoding of graphical entities selected from a set of graphical entities including points, lines, arcs, polygons, and nodes, and relating the position information and the plurality of attributes to the graphical entities to further characterize and distinguish between the plurality of geographical features; and
second computing means operably connected to the first computing means for receiving the position information, the graphical entities, and the attribute information from the first computing means and for storing the position information, the graphical entities, and the attribute information in the geographic information system.

5. In a mobile mapping system containing a computer, data storage, a geographic information system, a display, and a position sensor, a method for mapping comprising the steps of:
  moving the position sensor along a path to be mapped, while sensing position at various intervals;
  storing position information from the position sensor in data storage;
  receiving attribute information entered in real time;
  encoding attribute information into a plurality of data packets;
  storing the attribute packets in data storage;
  encoding graphical entities to represent a plurality of geographical features;
  relating the position information and the plurality of attributes to the graphical entities;
  converting the position information, the graphical entities, and the attribute information into a format for use by the geographic information system;
  storing the position information, the graphical entities, and the attribute information in the geographic information system to create a new map; and
  displaying the new map on the display so that the attribute information can be interactively entered in relation to the position information.

6. A mobile mapping system, comprising:
  means for transporting the mapping system along a path to be mapped;
  input means for capturing satellite based position information at various positions of the mapping system along the path to be mapped;
  means for recording the position information;
  means for managing and organizing data in a geographic information system;
  means for encoding graphical entities to be mapped such as points, lines and polygons, symbolizing geographic feature types, including location, graphic and spatial relationships of the physical characteristics of geographic features;
  means for entering and recording unlimited attribute information into the mapping system and relating the position and the attribute information to the graphical entities in real time as the input means is moved along the path to be mapped;
  means for storing the attribute information; and
  conversion means for real time conversion of the position information, the entities, and the attribute information into a form for use by the geographic information system to create a map while the transportable mapping system is transported along the path to be mapped.

7. A mobile mapping system according to claim 6, further comprising display means for displaying in real time a graphical representation of the captured position and the attribute information as the input means is moved along the path to be mapped.

8. In a mobile mapping system containing a computer, data storage, a display, and a position sensor, a method for updating a map comprising the steps of:
  moving the position sensor along a path to be mapped, while sensing position at various intervals;
  storing position information from the position sensor in data storage;
  receiving attribute information entered in real time;
  encoding attribute information into a plurality of data packets;
  storing the attribute packets in data storage;
  encoding graphical entities to represent a plurality of geographical features;
  relating the position information and the plurality of attribute data packets to the graphical entities;
  converting the position information, the graphical entities, and the attribute information into a format for use by a geographic information system;
  sending the position information, the entities, and the attribute information to the geographic information system to update a previously created map; and
  displaying on the display the updated map.

9. In a mobile mapping system containing an operator controlled computer, data storage, a geographic information system, a display, and a position sensor, a method for updating a map comprising the steps of:
  displaying on the display a previously created map stored in the geographic information system;
  moving the position sensor along a path to be mapped, while sensing position information at various intervals;
  storing position information from the position sensor in data storage;
  displaying on the display the position information by overlaying the position information on the previously created map;
  encoding graphical entities to be mapped such as points, lines and polygons, symbolizing geographic feature types, including location, graphic and spatial relationships of the physical characteristics of geographic features;
  storing the graphical entities in data storage;
  receiving unlimited attribute information entered in real time;

relating the position information and attribute information to the graphical entities;

storing the attribute information in data storage;

displaying on the display the attribute information and the graphical entities by overlaying the attribute information and the graphical entities on the previously created map;

converting the position information, the graphical entities, and the attribute information into a format for use by the geographic information system; and sending the position information, the graphical entities, and the attribute information to the geographic information system to update the previously created map.

10. In a mobile mapping system comprising an operator controlled computer, data storage, a geographic information system, a display, and a position sensor, a method for creating a map consisting of a plurality of entities comprising the steps of:

designating each entity and geographic feature of each entity to be mapped;

encoding entry commands with computer function keys;

collecting position information from the position sensor;

associating initial position information to an attribute corresponding to the time of the attribute creation;

entering textual attribute information describing each entity;

indicating a database field destination;

achieving the entry of the entity and attribute information with the computer function keys wherein an operator dialog is established for entry of the entity and attribute information which maintains correspondence with feature type and database field destination for each entry;

building attribute data packets comprising the geographic position at the time of the attribute creation with each attribute data packet comprising an identification number, text of attribute item, the entity type, and the database field destination code;

storing attribute data packets in data storage; and converting the position information geographic feature and attribute data packets to a form for use by the geographic information system.

* * * * *